US012803401B2

(12) United States Patent
Yonemori

(10) Patent No.: US 12,803,401 B2
(45) Date of Patent: Nov. 17, 2026

(54) VEHICLE DRIVE SYSTEM

(71) Applicant: Mazda Motor Corporation, Hiroshima (JP)

(72) Inventor: Kei Yonemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 308 days.

(21) Appl. No.: 18/660,450

(22) Filed: May 10, 2024

(65) Prior Publication Data

US 2024/0388181 A1 Nov. 21, 2024

(30) Foreign Application Priority Data

May 15, 2023 (JP) ................................ 2023-080426

(51) Int. Cl.
*H02P 1/00* (2006.01)
*B60L 15/20* (2006.01)
*B60L 58/19* (2019.01)
*B62D 1/04* (2006.01)
*H02K 17/14* (2006.01)

(52) U.S. Cl.
CPC .............. *H02K 17/14* (2013.01); *B60L 15/20* (2013.01); *B60L 58/19* (2019.02); *B62D 1/046* (2013.01)

(58) Field of Classification Search
CPC ...... H02P 25/20; H02P 27/06; H02P 29/0241; H02P 25/18; H02K 17/04
See application file for complete search history.

(56) References Cited

U.S. PATENT DOCUMENTS

2022/0219655 A1* 7/2022 Sakuragi ................... B60T 7/08

FOREIGN PATENT DOCUMENTS

| | | | | |
|---|---|---|---|---|
| CN | 107128189 A * | 9/2017 | ............. B60L 58/19 |
| DE | 102019102351 A1 | 7/2020 | |
| JP | H07-322413 A | 12/1995 | |
| WO | 2018096341 A1 | 5/2018 | |

OTHER PUBLICATIONS

Supplementary European Search Report mailed Nov. 5, 2024, in European Application No. 24174715.3, 9 pages.

* cited by examiner

*Primary Examiner* — Karen Masih
(74) *Attorney, Agent, or Firm* — XSENSUS LLP

(57) ABSTRACT

The vehicle drive system includes: a motor having a stator and a rotor; and a battery. The stator has primary conductors, the rotor has secondary conductors, and the battery has battery modules. A motor ECU and a battery ECU are provided. The motor ECU can change the number of poles of the motor by increasing/reducing the number of primary conductor groups, in each of which a current flows in the same direction and the primary conductors are continuously aligned in a circumferential direction. The battery ECU can change a connection mode of battery module pairs, which are electrically connected to each other, between in series and in parallel. The ECU, the motor ECU, and the battery ECU are configured to initiate changing the number of the poles and changing the connection mode of the battery module pairs at different timings from each other.

8 Claims, 12 Drawing Sheets

| | TRAVEL SCENE | REQUIRED TORQUE | NUMBER OF POLES | MOTOR ROTATION SPEED | BACK ELECTROMOTIVE VOLTAGE | BATTERY | AVAILABLE POTENTIAL DIFFERENCE | RECOMMENDED CONNECTION MODE | TARGET POTENTIAL DIFFERENCE |
|---|---|---|---|---|---|---|---|---|---|
| (1) | OVERTAKING DURING HIGH-SPEED TRAVEL | +HIGH | LARGE | +HIGH | +HIGH | DISCHARGED | SMALL | IN SERIES | LARGE |
| (6) | START TRAVELING ON UPHILL ROAD | | | +LOW | +LOW | | MEDIUM | IN PARALLEL | SMALL |
| (3) | HIGH-SPEED CRUISING | +LOW | SMALL | +HIGH | +HIGH | | | IN SERIES | LARGE |
| (4) | SLOW DRIVING IN URBAN AREA | | | +LOW | +LOW | | LARGE | IN PARALLEL | SMALL |
| (2) | SUDDEN DECELERATION DURING HIGH-SPEED TRAVEL | -HIGH | LARGE | +HIGH | +HIGH | CHARGED | | | |
| | SUDDEN DECELERATION IN URBAN AREA | | | +LOW | +LOW | | | | |
| (5) | SLOW DECELERATION DURING HIGH-SPEED TRAVEL | -LOW | SMALL | +HIGH | +HIGH | | | | |
| | SLOW DECELERATION IN URBAN AREA | | | +LOW | +LOW | | | | |

Fig. 11

VEHICLE DRIVE SYSTEM

CROSS-REFERENCE TO RELATED APPLICATION

The present application claims priority to Japanese Patent Application 2023-080426, filed May 15, 2023, the entire contents of which are incorporated herein by reference.

BACKGROUND

Field

The present disclosure relates to a vehicle drive system and, in particular, to a vehicle drive system capable of changing a characteristic of a motor.

Description of the Related Art

Conventionally, an electric vehicle that is not equipped with an internal combustion engine (an engine) and travels by using an electric motor (a motor) as a drive source has been known.

While the engine hardly generates torque from zero to a certain rotation speed, the motor can generate maximum torque from a zero rotation speed. Thus, such an electric vehicle is often not equipped with a transmission (except for reduction gears) that is essential for the engine vehicle. For this reason, when a user who is accustomed to driving the engine vehicle equipped with the transmission drives the electric vehicle, the user may feel a sense of discomfort.

Accordingly, in regard to the electric vehicle not equipped with the transmission, it is considered to change a characteristic of the motor as the drive source in a situation where gear shifting by the transmission occurs as in the engine vehicle. Various methods for changing the characteristic of the motor are available, and one thereof is a rotary electric machine controller disclosed in Patent document 1, for example. The rotary electric machine controller controls a current phase of a winding pair to convert the number of poles of a rotary electric machine (motor).

PRIOR ART DOCUMENTS

Patent Documents

[Patent document 1] JPH7-322413A

SUMMARY

By the way, favorable acceleration performance of the electric vehicle is often achieved by controlling the motor rotation speed and a vehicle speed proportionally, for example, in such a manner that, when an accelerator pedal is depressed, the motor rotation speed is increased, which in turn increases the vehicle speed. However, such control causes the user who is accustomed to the engine vehicle to obtain a feeling of riding a go-cart, and this is thus one of the reasons why the user feels the sense of discomfort.

In view of the above, it is considered to apply the rotary electric machine controller in Patent document 1 to the electric vehicle. However, the rotary electric machine controller in Patent document 1 only changes the number of the poles in control for shifting the current phase when it is determined that the motor rotation speed exceeds a predetermined value. Thus, the rotary electric machine controller in Patent document 1 does not change the characteristic of the motor in such a situation that gear shifting occurs in the engine vehicle.

Accordingly, even when the rotary electric machine controller in Patent document 1 is simply applied to the electric vehicle, it is impossible to completely solve the problem of giving a different driving feeling (the sense of discomfort) to a driver who is accustomed to the engine vehicle.

To handle the above problem, it is considered to also adopt a method for changing the characteristic of the motor, such as a voltage control method or a current control method, in addition to the pole number changing method, so as to generate a wide range of required output according to the driver's preference in the electric vehicle not equipped with the transmission. However, when these methods are executed simultaneously, a vehicle system becomes unstable due to a rapid state change.

The disclosure has been made in view of such a point and therefore has a purpose of providing a vehicle drive system capable of changing a characteristic of a motor while suppressing instability of a vehicle system.

Means for Solving the Problem

In order to achieve the above purpose, a vehicle drive system according to the disclosure has different initiation timings of plural methods for changing a characteristic of a motor.

More specifically, the disclosure provides the vehicle drive system including: the motor that has a cylindrical stator and a cylindrical rotor rotatably provided in the stator to be coaxial with a center axis of the stator and that drives a drive wheel of a vehicle by rotation of the rotor; and a battery that supplies electric power to the motor.

In this vehicle drive system, the stator has plural primary conductors that extend in an axial direction and are aligned in a circumferential direction, the rotor has plural secondary conductors that extend in the axial direction and are aligned in the circumferential direction in a radially outer portion, and the battery has plural battery modules. The vehicle drive system further includes: a motor control section capable of changing the number of poles of the stator by changing a direction of a current flowing through the plural primary conductors in the motor and increasing/reducing the number of primary conductor groups, in each of which the current flows in the same direction and the primary conductors are continuously aligned in the circumferential direction; and a battery control section capable of changing a connection mode of at least one battery module pair between in series and in parallel, the at least one battery module pair constituting the plural battery modules, and the battery module pairs being electrically connected to each other. The motor control section and the battery control section are configured to start changing the number of the poles of the stator by the motor control section and changing the connection mode of the battery module pair by the battery control section at different timings from each other.

With this configuration, when the motor control section changes the number of the poles of the stator, the characteristic of the motor can be changed before and after the change. For example, when the number of the poles of the stator is relatively increased, motor torque is relatively increased (a motor rotation speed is reduced), and thus a similar feeling to that obtained at a low-speed stage can be induced. Meanwhile, when the number of the poles of the stator is relatively reduced, the motor rotation speed is relatively increased (the motor torque is reduced), and thus a similar feeling to that obtained at a high-speed stage can be induced.

In addition, the motor has a property that the motor torque is increased in proportion to the current, while the motor rotation speed is increased with an increase in a voltage. However, according to this configuration, since the battery control unit changes the connection mode of the battery module pair between in series and in parallel, the characteristic of the motor can be changed before and after the change. For example, when the number of the battery module pairs connected in parallel is increased, the large current is supplied to the motor, and thus the motor torque can be increased relatively. Meanwhile, when the number of the battery module pairs connected in series is increased, the high voltage is supplied to the motor, and thus the motor rotation speed can be increased relatively.

When such a change of the connection mode by the battery control section and such a change of the number of the poles by the motor control section are made together, with effects of both of the changes, the motor torque can further be increased, and the motor rotation speed can further be increased. Thus, it is possible to handle a wide range of required output according to a driver's preference.

However, in the case where the change of the connection mode and the change of the number of the poles are initiated at the same timing, the vehicle system may become unstable due to a sudden state change. However, in the disclosure, since the motor control section and the battery control section are configured to initiate the change of the number of poles and the change of the connection mode at the different timings, it is possible to change the characteristic of the motor while suppressing the vehicle system from becoming unstable.

In the vehicle drive system, the battery control section may be configured to change the connection mode of the battery module pair when a predetermined time elapses after the number of the poles is changed in the case where the motor control section changes the number of the poles of the stator.

With this configuration, the connection mode of the battery module pair is changed when the predetermined time elapses after the number of the poles of the stator is changed, in other words, after a transition state of the pole number change is stabilized. Thus, it is possible to reliably suppress the vehicle system from becoming unstable.

Furthermore, in the vehicle drive system, the battery control section may be configured to increase the number of the battery module pairs connected in parallel to be larger than the current number thereof in the case where a power supply voltage of the battery is higher than a back electromotive voltage of the motor and a potential difference between the power supply voltage and the back electromotive voltage is larger than a target potential difference that is set in advance according to a travel mode of the vehicle.

The electric power moves from the higher voltage to the lower voltage. In the case where the power supply voltage of the battery is higher than the back electromotive voltage of the motor, that is, in the case of electrical discharge in which the electric power moves (is supplied) to the motor side, the potential difference that can be used to rotationally drive the motor (tentatively referred to as an "available potential difference") is generated.

Here, the power supply voltage of the battery fluctuates in conjunction with a state of charge (SOC). However, since the back electromotive voltage is increased with an increase in the motor rotation speed, the available potential difference tends to be reduced. Meanwhile, the back electromotive voltage is reduced with a reduction in the motor rotation speed, the available potential difference tends to be increased. In other words, the available potential difference is increased or reduced according to a travel mode of the vehicle.

In this regard, according to this configuration, in the case of discharge, when the available potential difference is larger than the target potential difference, which is set in advance according to the travel mode of the vehicle, in other words, when there is a margin of voltage (in such a travel mode with the low motor rotation speed, or the like), the number of the battery module pairs connected in parallel is increased than the current number thereof. Thus, the motor torque can be increased relatively by supplying the large current to the motor.

Moreover, in the vehicle drive system, the battery control section may be configured to increase the number of the battery module pairs connected in series to be larger than the current number thereof in the case where a power supply voltage of the battery is higher than a back electromotive voltage of the motor and a positional difference between the power supply voltage and the back electromotive voltage is equal to or smaller than a target potential difference that is set in advance according to a travel mode of the vehicle.

With this configuration, in the case of discharge, when the available potential difference is equal to or smaller than the target potential difference, in other words, when there is no margin of voltage (in the travel mode with the high motor rotation speed, or the like), the number of the battery module pairs connected in series is increased than the current number thereof. As a result, the higher voltage is supplied to the motor, and the motor rotation speed can thereby be increased relatively.

Furthermore, in the vehicle drive system, a paddle shift switch may be provided on a steering wheel of the vehicle, and the motor control section may be configured to change the number of the poles of the stator in response to an operation of the paddle shift switch by the driver.

With this configuration, since the number of the poles of the stator is changed in response to the operation of the paddle shift switch by the driver, in other words, the number of the poles is changed in response to the driver's request. Thus, motor control that further corresponds to the driver's preference can be executed.

Advantages

As it has been described so far, the vehicle drive system according to the disclosure can change the characteristic of the motor while suppressing the instability of the vehicle system.

BRIEF DESCRIPTION OF THE DRAWINGS

The scope of the present disclosure is best understood from the following detailed description of exemplary embodiments when read in conjunction with the accompanying drawings.

FIGS. 10A and 10B include views, each of which schematically illustrate a principle of rotation of the motor, and in which FIG. 10A illustrates an eight-pole motor in a low-speed range, and FIG. 10B illustrates a four-pole motor in a high-speed range.

FIG. 11 is a table presenting tendencies of a target potential difference.

DETAILED DESCRIPTION

A description will hereinafter be made on a mode for carrying out the disclosure with reference to the drawings.

(Overall Configuration of Electric Vehicle)

Figure 1:
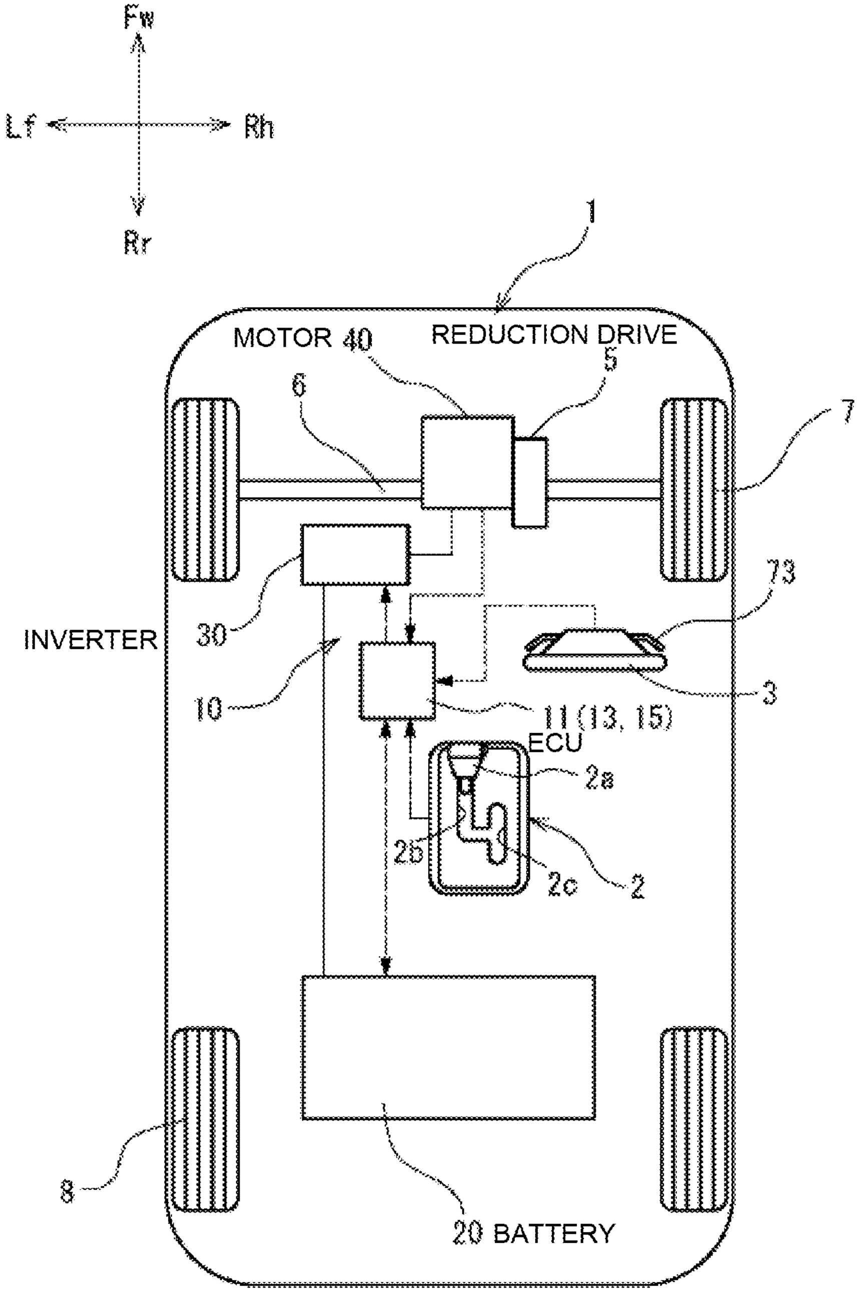
FIG. 1 is a plan view schematically illustrating a vehicle on which a vehicle drive system according to an embodiment of the disclosure is mounted.

FIG. 1 is a plan view schematically illustrating a vehicle 1 on which a vehicle drive system 10 according to this embodiment is mounted. FIG. 1 indicates a front side Fw in a vehicle front-rear direction, a rear side Rr in the vehicle front-rear direction, a right side Rh in a vehicle width direction, and a left side Lf in the vehicle width direction. As illustrated in FIG. 1, the vehicle 1 includes a battery 20, an inverter 30, a motor 40, and various electronic control units (ECUs) 11, 13, 15 for controlling these components. These battery 20, inverter 30, motor 40, and various ECUs 11, 13, 15 constitute essential parts of the vehicle drive system 10.

In this vehicle 1, the inverter 30 converts a direct current supplied from the battery 20 to an alternating current and supplies the alternating current to the motor 40, and the motor 40 is thereby rotationally driven. Torque generated by the motor 40, which is rotationally driven just as described, is reduced by a reduction drive 5 and then output to a driveshaft 6. Consequently, a right and left pair of drive wheels (front wheels 7) is rotationally driven to cause rotation of driven wheels (rear wheels 8). In this way, the vehicle 1 travels. That is, the vehicle 1 is configured as an electric vehicle that travels by using the motor 40 as a drive source. Thus, hereinafter, the vehicle 1 will also be referred to as an "electric vehicle 1".

As illustrated in FIG. 1, the electric vehicle 1 also includes a shifter 2 and a paddle switch 73 that is provided on a steering wheel 3. A signal corresponding to an operation of each of these shifter 2 and paddle switch 73 is input to the ECU 11. This electric vehicle 1 is not equipped with a transmission, which is normally mounted on an engine vehicle. However, when a driver operates any of these shifter 2 and paddle switch 73, a characteristic of the motor 40 is changed to enable "driving" that reflects the driver's preference.

(Vehicle Drive System)

Figure 2:
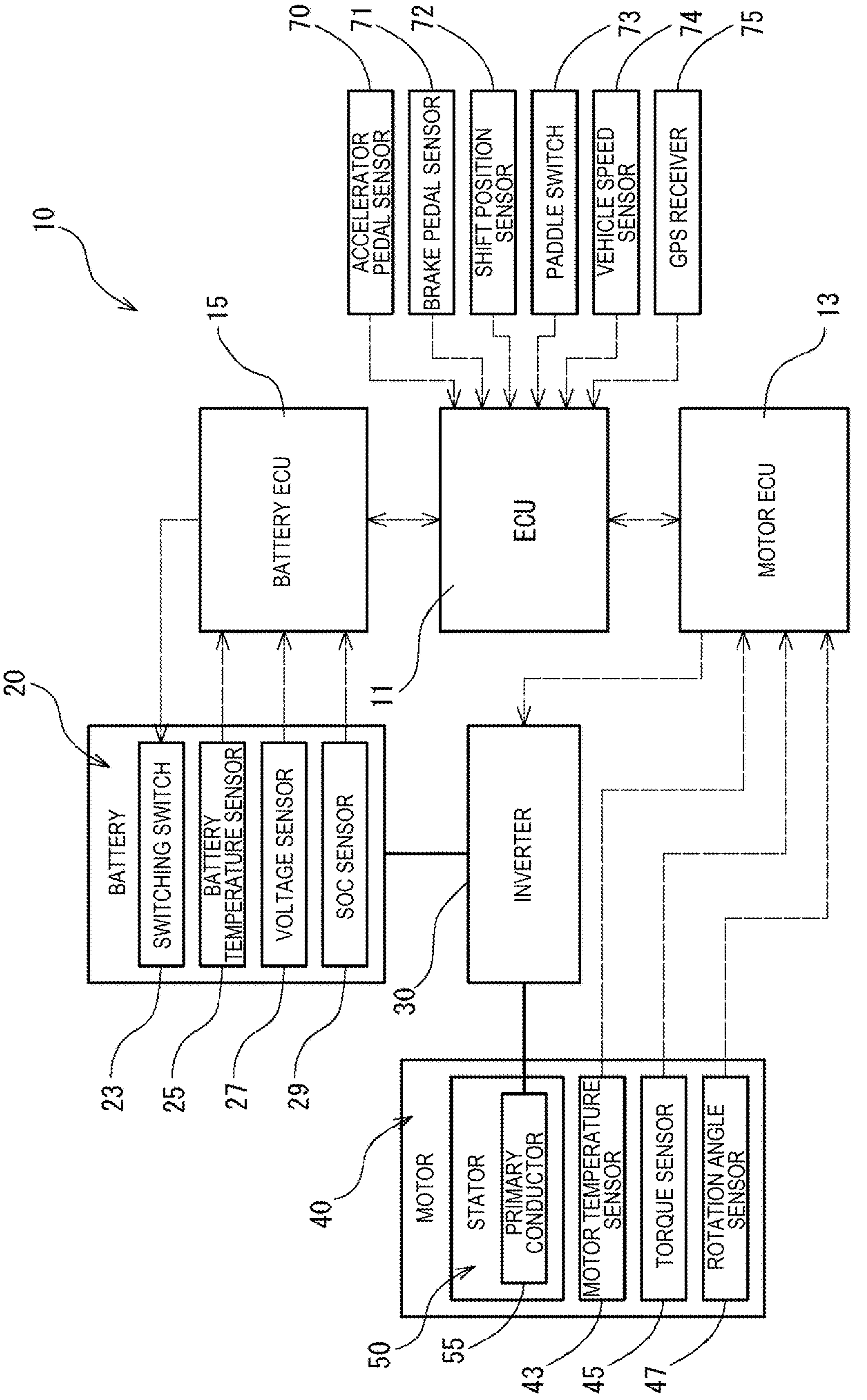
FIG. 2 is a block diagram schematically illustrating the vehicle drive system.

FIG. 2 is a diagram schematically illustrating the vehicle drive system 10. As illustrated in FIG. 2, this vehicle drive system 10 includes the ECU 11, the motor ECU 13, the battery ECU 15, the battery 20, the inverter 30, the motor 40, various sensors (including switches) 70, 71, 72, 73, 74, and a Global Positioning Sensor (GPS) receiver 75. For example, the various sensors 70, 71, 72, 73, 74 detect an accelerator pedal depression amount, a brake pedal depression amount, a vehicle speed V of the electric vehicle 1, and the like.

—ECU—

The ECU 11 is configured to include a so-called microcomputer having, for example, a central processing unit (CPU), read only memory (ROM) that stores a program executed by the CPU, a map, and the like in advance, random access memory (RAM) in which the CPU temporarily stores data when necessary, backup RAM that holds the data even when power is cut off, an input/output interface, and the like. The CPU processes the signal according to the program that is stored in the ROM in advance while using a temporary storage function of the RAM, and thereby executes various types of control.

In addition, the ECU 11 is connected to the motor ECU 13 and the battery ECU 15 via a controller area network (CAN) communication line, can exchange information with each other as indicated by broken arrows in FIG. 2, and plays a role in integrating the motor ECU 13 and the battery ECU 15.

Furthermore, as illustrated in FIG. 2, the ECU 11 is electrically connected to an accelerator pedal sensor 70, a brake pedal sensor 71, a shift position sensor 72, the paddle switch 73, a vehicle speed sensor 74, and the GPS receiver 75, and detection results and various types of information are input/transmitted from these sensors to the ECU 11.

The accelerator pedal sensor 70 is attached to an accelerator pedal, detects the accelerator pedal depression amount, and outputs a signal representing the detected accelerator pedal depression amount to the ECU 11. The accelerator pedal sensor 70 may be configured to detect an accelerator pedal depression change amount (a change amount per unit time).

The brake pedal sensor 71 is attached to a brake pedal, detects the brake pedal depression amount, and outputs a signal representing the detected brake pedal depression amount to the ECU 11. The brake pedal sensor 71 may be configured to detect a brake pedal depression change amount (a change amount per unit time).

The shift position sensor 72 is provided to each shift position in the shifter 2, detects which of a parking (P) range, a reverse (R) range, a drive (D) range, and a manual (M) range a shift lever 2*a* is located, and outputs a detection result to the ECU 11. The P range, the R range, and the D range are arranged in a main gate 2*b* while the M range is arranged in a sub gate 2*c*. Furthermore, the sub gate 2*c* is a returnable gate with the M range being a reference position. The shift position sensor 72 is configured to output, to the ECU 11, a signal in any of five levels D−−, D−, D, D+, D++ in response to the number of operations to move the shift lever 2*a* to the front in the vehicle front-rear direction (positive operations) or the number of operations to move the shift lever 2*a* to the rear in the vehicle front-rear direction (negative operations) performed by the driver.

The paddle switch 73 is a returnable switch that is provided as a right and left pair on a back side (the front side in the vehicle front-rear direction) of the steering wheel 3 and that can repeatedly be pulled toward the driver (rearward in the vehicle front-rear direction) by the driver. The right and left pair of the paddle switches 73 is configured to output, to the ECU 11, a signal in any of five levels D−−, D−, D, D+, D++ in response to the number of operations to pull the paddle switch 73 on the right side in the vehicle width direction toward the driver (positive operations) or the number of operations to pull the paddle switch 73 on the left side in the vehicle width direction toward the driver (negative operations).

In the ROM of the ECU 11, required torque for the motor 40 is stored and set to be increased in an order of D−−, D−, D, D+, D++. Then, as will be described below, the ECU 11 controls the motor 40 by reflecting the driver's intention that is expressed by the operation of the shift lever 2*a* or the paddle switch 73. In the following description, a mode in which such control is executed will also be referred to as a "manual mode".

The vehicle speed sensor 74 is configured to detect the vehicle speed V of the electric vehicle 1 on the basis of wheel rotation speeds of the drive wheels (the front wheels 7) and the like and output a signal representing the detected vehicle speed V to the ECU 11. The ECU 11 is configured to control the motor 40 on the basis of the vehicle speed V detected by the vehicle speed sensor 74, and the like.

The GPS receiver 75 measures a location of the electric vehicle 1 (for example, latitude and longitude of the electric vehicle 1) by receiving radio waves from plural GPS satellites, and transmits the location information to the ECU 11. The ECU 11 is configured to acquire (recognize) surrounding travel environment of the electric vehicle 1 on the basis of the location information received from the GPS receiver 75, a map database stored in the ROM, for example, and the like. More specifically, the ECU 11 acquires information such as on whether the electric vehicle 1 is traveling on a flat road, traveling on an uphill road, traveling on a downhill road, turning, traveling on a winding road, or traveling in an urban area. Here, when the information such as on whether the electric vehicle 1 is traveling on the uphill road or the downhill road is to be acquired, the method for acquiring the surrounding travel environment is not limited thereto, and a gradient sensor that detects a road surface gradient may be used.

—Battery—

The battery 20 is configured as a battery pack in which plural electrically-connected battery modules (e.g., individual battery packs) 21 (see FIG. 3) are stacked and accommodated in a battery case. Each of the battery modules 21 includes, as a main portion, plural battery cells, each of which is a lithium-ion secondary battery, a nickel-metal hydride secondary battery, or the like. In detail, each of the battery modules 21 is a module that is formed by electrically connecting the plural battery cells. The battery cells and insulators are alternately stacked in a manner to hold the insulator between two each of the battery cells.

As illustrated in FIG. 2, a battery temperature sensor 25, a voltage sensor 27, an SOC sensor 29, and the like are attached to the battery 20. The battery temperature sensor 25 detects a temperature of the battery 20. The voltage sensor 27 detects a voltage (a DC power supply voltage value PSV) of the battery 20. The SOC sensor detects an SOC of the battery 20. These battery temperature sensor 25, voltage sensor 27, and SOC sensor 29 are electrically connected to the battery ECU 15 and configured to output a signal representing the detected temperature, a signal representing the detected voltage, and a signal representing the SOC to the battery ECU 15, respectively.

—Battery ECU—

Similar to the ECU 11, the battery ECU 15 is configured to include a so-called microcomputer having, for example, a CPU, ROM, RAM, backup RAM, an input/output interface, and the like. The CPU processes the signal according to the program that is stored in the ROM in advance while using a temporary storage function of the RAM, and thereby executes various types of control.

As described above, the battery ECU 15 is connected to the ECU 11 via the CAN communication line and is configured to output, to the ECU 11, signals on the temperature of the battery 20 received from the battery temperature sensor 25, the DC power supply voltage value PSV of the battery 20 received from the voltage sensor 27, and the SOC of the battery 20 received from the SOC sensor 29. In addition, when the temperature of the battery 20 is excessively low, regenerative charging capability is impaired. On the contrary, when the temperature of the battery 20 is excessively high, failure possibly occurs. Thus, the battery ECU 15 is configured to adjust a flow rate of a battery coolant, and the like on the basis of the temperature of the battery 20.

Figure 3A:
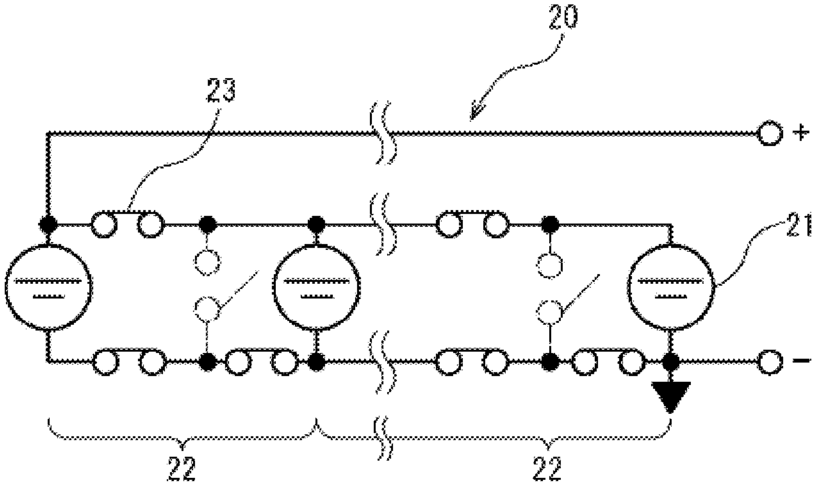
FIGS. 3A and 3B include views, each of which schematically illustrate a configuration of a battery.
Figure 3B:
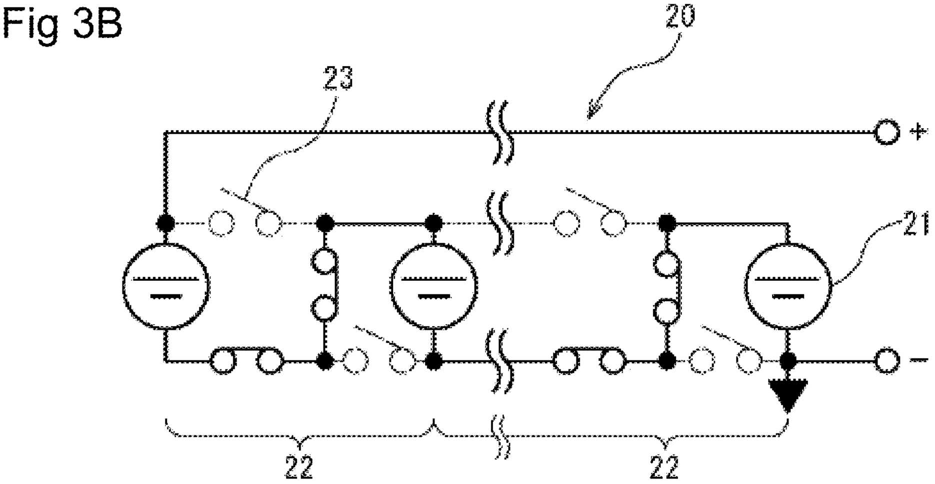

FIGS. 3A and 3B include views, each of which schematically illustrate the configuration of the battery 20. In FIGS. 3A and 3B, in order to make the drawing easily viewable, the battery modules 21 and switching switches 23 are deformed. As illustrated in FIGS. 3A and 3B, the plural battery modules 21 are configured to include plural ([number of the battery modules 21−1]) battery module pairs 22 that are electrically connected to each other via the switching switches 23. Each of the switching switches 23 is configured to be switched between ON/OFF on the basis of a command from the battery ECU 15.

With such a configuration, when the switching switch 23 is switched by the command from the battery ECU 15 as illustrated in FIG. 3A, all of the plural battery modules 21 (the battery module pairs 22) can be connected in parallel in the battery 20. Just as described, when all of the plural battery modules 21 are connected in parallel in the battery 20, a supply voltage is relatively reduced, but a supply current can relatively be increased.

Meanwhile, when the switching switch 23 is switched by the command from the battery ECU 15 as illustrated in FIG. 3B, all of the plural battery modules 21 (the battery module pairs 22) can be connected in series in the battery 20. Just as described, when all of the plural battery modules 21 are connected in series in the battery 20, the supply current is relatively reduced, but the supply voltage can relatively be increased.

When the switching switch 23 is switched by the command from the battery ECU 15, a connection mode of some of the battery module pairs 22 can be set in series, and the connection mode of the rest of the battery module pairs 22 can be set in parallel.

From the above, in relation to the claims, the ECU 11 and the battery ECU 15 in this embodiment correspond to a "battery control section (e.g., battery circuitry) capable of changing a connection mode of at least one of battery module pairs that constitute plural battery modules and are electrically connected to each other between in series and in parallel" as described in the disclosure.

The battery ECU 15 and the battery 20 can change the connection mode of the battery module pairs 22 between in series and in parallel not only when the electric vehicle 1 is stopped or parked but also when the electric vehicle 1 is traveling.

—Motor and Inverter—

<Overall Configuration>

Figure 4:
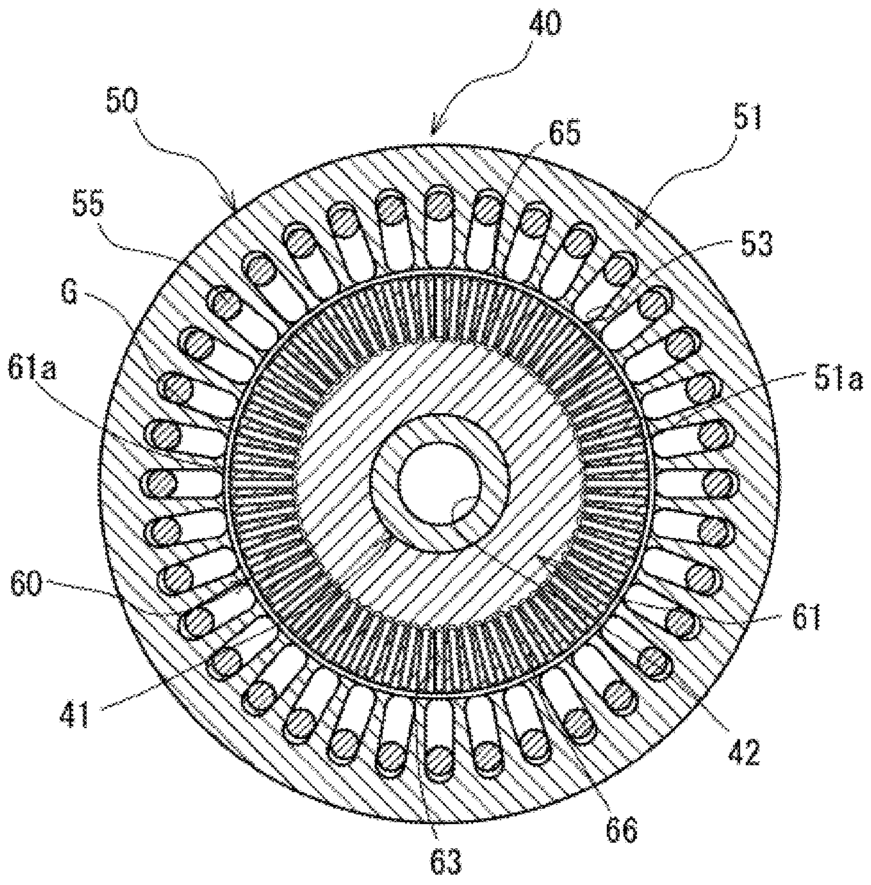
FIG. 4 is a cross-sectional view schematically illustrating a motor.

FIG. 4 is a cross-sectional view schematically illustrating the motor 40. In FIG. 4, in order to make the drawing easily viewable, a secondary conductor 65 and a resin 66 are not hatched. In addition, in FIG. 4, in order to make the drawing easily viewable, an air gap G is exaggerated in size. As illustrated in FIG. 4, the motor 40 includes a rotary shaft 41, a rotor 60, and a stator 50. The motor 40 is mounted on the electric vehicle 1 in a manner to set the rotary shaft 41 to be substantially horizontal.

The rotary shaft 41 is supported by a casing of the motor 40 to be rotatable by a bearing. The rotary shaft 41 is formed in a cylindrical shape, and an internal space thereof constitutes a channel 42 through which a refrigerant for cooling each section of the motor 40 flows. A pump is connected to one end of the channel 42, and the refrigerant is supplied by this pump.

The rotor 60 is formed in a cylindrical shape whose inner diameter is slightly larger than an outer diameter of the rotary shaft 41. The rotor 60 is arranged on a radially outer side of the rotary shaft 41 and is attached to the rotary shaft 41 in an integrally rotatable manner therewith. Meanwhile, the stator 50 is formed in a cylindrical shape, and is arranged on a radially outer side of the rotor 60 such that a center axis of the stator 50 matches a center axis of the rotary shaft 41. In other words, the rotor 60 is rotatably arranged in the stator 50 to be coaxial with the center axis of the stator 50. An inner diameter of the stator 50 and an outer diameter of the rotor 60 are set to such dimensions that, when the rotor 60 is arranged in the stator 50, an inner circumferential surface 51*a* of the stator 50 and an outer circumferential surface 61*a* of the rotor 60 oppose each other across the air gap G.

In addition, as illustrated in FIG. 2, a motor temperature sensor 43, a torque sensor 45, a rotation angle sensor 47, and the like are attached to the motor 40. The motor temperature sensor 43 detects a temperature of the motor 40, the torque sensor 45 detects motor torque, and the rotation angle sensor 47 detects a rotation angle of the rotor 60. These motor temperature sensor 43, torque sensor 45, and rotation angle sensor 47 are electrically connected to the motor ECU 13 and output, to the motor ECU 13, a signal representing the detected temperature, a signal representing a magnitude of the motor torque, and a signal representing the rotation angle of the rotor 60, respectively.

In the thus-configured motor 40, a drive current is supplied to the stator 50 from the battery 20 via the inverter 30 on the basis of a command from the motor ECU 13. Consequently, a rotating magnetic field is created in the stator 50, which in turn rotationally drives the rotor 60 and drives the front wheels 7 of the electric vehicle 1. In other words, the motor 40 in this embodiment is configured as an induction motor. Hereinafter, the rotor 60, the stator 50, and the inverter 30 will be described in detail.

<Rotor>

As illustrated in FIG. 4, the rotor 60 has a rotor core 61 and the plural secondary conductors 65 embedded in the rotor core 61.

For example, the rotor core 61 is formed in a cylindrical shape by stacking and integrally coupling plural sheet bodies, each of which is formed in a ring shape by punching out an electromagnetic steel sheet as a magnetic material such as iron. In an outer circumferential section of the rotor core 61, 72 groove strips 63 are formed at equally-spaced intervals in a circumferential direction. Each of the groove strips 63 has a rectangular cross section, extends over an entire axial length of the rotor core 61, and is recessed radially inward from the outer circumferential surface 61*a* of the rotor core 61. In other words, in the outer circumferential section of the rotor core 61, the 72 groove strips 63, each of which extends in the radial direction, are radiated when seen in the axial direction.

Figure 5:
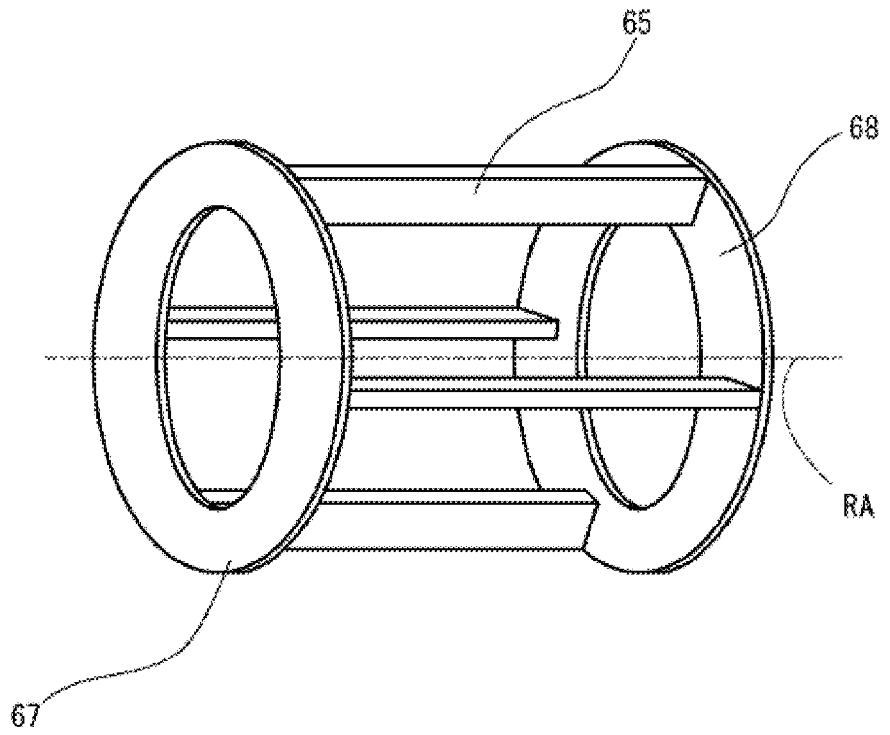
FIG. 5 is a perspective view schematically illustrating a secondary conductor.

FIG. 5 is a perspective view schematically illustrating the secondary conductor 65. In FIG. 5, in order to make the drawing easily viewable, only 4 of the 72 secondary conductors 65 are illustrated. In addition, FIG. 5 illustrates a rotation axis RA of the motor 40. Each of the secondary conductors 65 is made of a magnetic material such as copper and, as illustrated in FIG. 4 and FIG. 5, formed in a rectangular plate shape that extends over an entire axial length of the rotor 60. Each of the 72 secondary conductors 65 is inserted in respective one of the groove strips 63 that are formed in the outer circumferential section of the rotor core 61. In this way, the 72 secondary conductors 65 are aligned in the circumferential direction and radiated when seen in the axial direction. A gap between each of the groove strips 63 and each of the secondary conductors 65 inserted in the respective groove strip 63 is filled with the resin 66 that is supplied by injection molding. In this way, the rotor core 61 and the secondary conductors 65 are integrated. Here, FIG. 4 illustrates the 72 groove strips 63 and the 72 secondary conductors 65. However, these are merely illustrative, and the number of the groove strips 63 and the number of the secondary conductors 65 are not limited thereto.

As illustrated in FIG. 5, in each of the 72 secondary conductors 65, an end portion on one side (a left side in FIG. 5) in the axial direction (of the rotation axis RA) is coupled to a copper-made first end ring 67 (a shortening ring) by welding or the like, and an end portion on the other side (a right side in FIG. 5) in the axial direction is coupled to a copper-made second end ring 68 (a shortening ring) by welding or the like. In this way, the 72 secondary conductors 65 define a cage shape. The 72 secondary conductors 65 are electrically connected to each other via the first and second end rings 67, 68, just as described, and thereby form a closed circuit. When each of the secondary conductors 65 crosses the magnetic field, an induced electromotive force is generated in the respective secondary conductor 65 due to electromagnetic induction. However, since the 72 secondary conductors 65 form the closed circuit as described above, an induced current flows through each of the secondary conductors 65. Here, in order to prevent current leakage, which possibly occurs when the induced currents flow in opposite directions through the circumferentially-adjacent secondary conductors 65, as much as possible, an outer circumferential surface of each of the secondary conductors 65 is covered with an insulator.

<Stator>

As illustrated in FIG. 4, the stator 50 has a cylindrical stator core 51 and plural primary conductors 55, each of which is provided in the stator core 51 in a manner to penetrate the stator 50 in the axial direction.

The stator core 51 may be formed by stacking and integrally coupling plural electromagnetic steel sheets, each of which is punched into a predetermined shape, for example, or may be formed of a powder magnetic body that is formed by subjecting magnetic powder to compression molding in a mold, for example. The stator core 51 has plural grooves referred to as slots 53. Each of the slots 53 extends radially outward from the inner circumferential surface 51*a* of the stator core 51, and the adjacent slots 53 separate from each other in a circumferential direction of the stator core 51.

Figure 6:
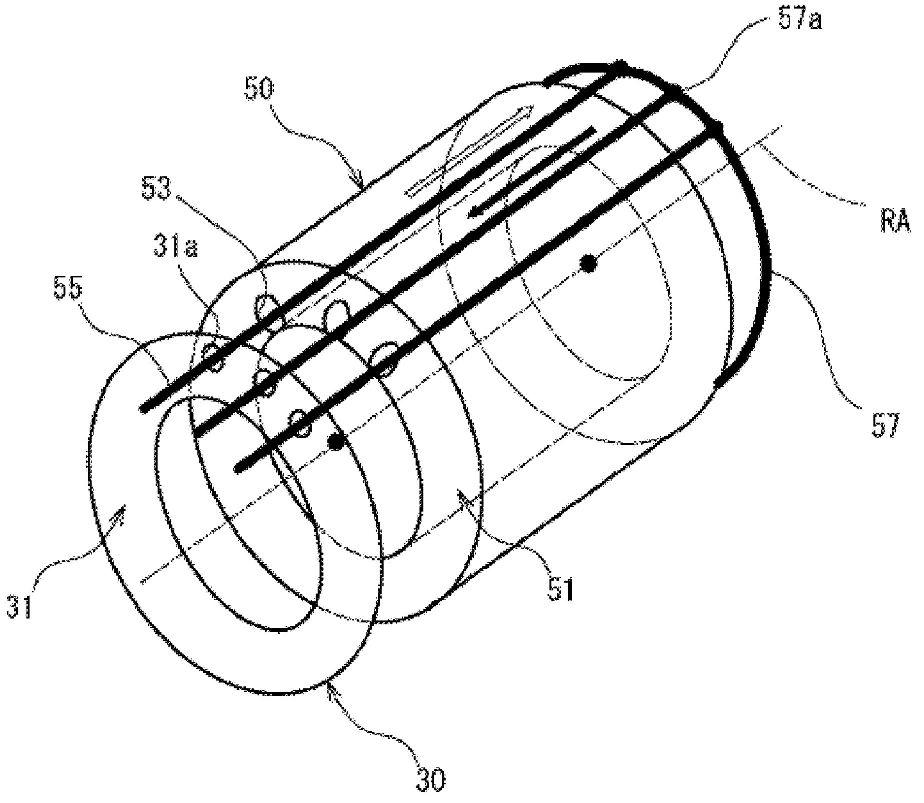
FIG. 6 is a perspective view schematically illustrating a primary conductor and an inverter.

FIG. 6 is a perspective view schematically illustrating the primary conductor 55 and the inverter 30. In FIG. 6, in order to make the drawing easily viewable, only 3 of the 36 primary conductors 55 are illustrated. Each of the primary conductors 55 is made of the magnetic material such as copper and, as illustrated in FIG. 4 and FIG. 6, formed in a round rod shape that extends over the entire axial length of the rotor 60. Since each of the primary conductors 55 is inserted in the respective slot 53, the 36 primary conductors 55 are aligned circumferentially and intermittently in a circular pattern when seen in the axial direction. Here, FIG. 4 illustrates the 36 slots 53 and the 36 primary conductors 55. However, this illustration is merely one example, and the number of the slots 53 and the number of the primary conductors 55 are not limited thereto.

As illustrated in FIG. 6, in the 36 primary conductors 55, each of which is inserted in the respective slot 53, each of end portions thereof on the other side (a right side in FIG. 6) in the axial direction (of the rotation axis RA) is connected to a copper-made bus ring 57 by welding or the like, and each connection section 57*a* constitutes a neutral point with a potential of 0 (V). Meanwhile, each of end portions on the one axial side (a left side in FIG. 6) of the primary conductors 55 penetrates a respective hole 31*a* and is projected to the one axial side from a board 31. The holes 31*a* are formed on the ring-shaped board 31 of the inverter 30 and are aligned circumferentially and intermittently in a circular pattern.

<Inverter>

Figure 7:
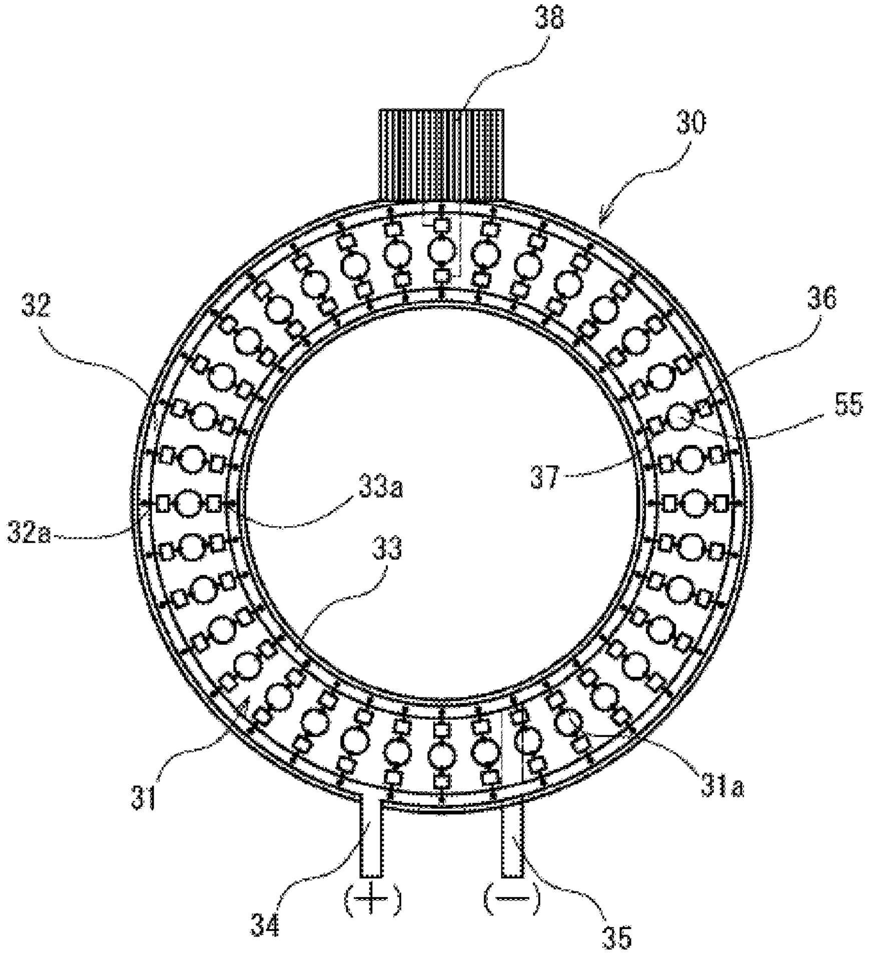
FIG. 7 is a front view schematically illustrating the inverter.

FIG. 7 is a front view schematically illustrating the inverter 30. As illustrated in FIG. 7, the inverter 30 includes, in addition to the board 31, an outer ring section 32, an inner ring section 33, a (+) terminal 34, a (−) terminal 35, an outer arm element 36, an inner arm element 37, and a signal line terminal 38. The inverter 30 is integrated with the motor 40 as illustrated in FIG. 6.

The outer ring section 32 is a ring-shaped member that is made of copper, and is attached to a radially outer portion of a surface on the one axial side of the ring-shaped board 31 in a coaxial manner with the board 31. This outer ring section 32 is integrally formed with the (+) terminal 34 that extends downward, and this (+) terminal 34 is connected to a positive terminal of the battery 20. In this way, the direct current is supplied to the outer ring section 32. This outer ring section 32 is electrically connected to each of the end portions of the 36 primary conductors 55, which are projected to the one axial side from the board 31, via an outer arm 32*a* that is made of copper and extends radially inward.

The inner ring section 33 is a ring-shaped member that is made of copper and formed to have a smaller diameter than the outer ring section 32, and is attached to a radially inner portion of the surface on the one axial side of the ring-shaped board 31 in the coaxial manner with the board 31. This inner ring section 33 is integrally formed with the (−) terminal 35, and this (−) terminal 35 is connected to a negative terminal of the battery 20. The (−) terminal 35 is connected to the inner ring section 33 on the surface on the one axial side of the board 31, penetrates the board 31 to a back side, and extends downward from a surface on the other axial side thereof. In addition, this inner ring section 33 is electrically connected to each of the end portions of the 36 primary conductors 55 via an inner arm 33*a* that is made of copper and extends radially outward.

As illustrated in FIG. 7, the outer arm element 36 is provided at an intermediate position of the outer arm 32*a*, and the inner arm element 37 is provided at an intermediate position of the inner arm 33*a*. Each of the outer arm element 36 and the inner arm element 37 is configured as a metal-oxide-semiconductor field-effect transistor (Si-MOSFET), for example, and enables high-speed switching. As indicated by broken lines in FIG. 7, the 36 outer arm elements 36 and the 36 inner arm elements 37 are each electrically connected to the signal line terminal 38, and switch ON/OFF of each of these outer arm elements 36 and inner arm elements 37 is separately controlled by the signal line terminal 38. The switch ON/OFF control by the signal line terminal 38 is executed on the basis of a command from the motor ECU 13.

When the outer arm element 36 is switched ON, the current flows from the outer ring section 32 to the primary conductor 55. Meanwhile, when the outer arm element 36 is switched OFF, the outer ring section 32 and the primary conductor 55 are insulated to prevent the current flow from the outer ring section 32 to the primary conductor 55. Similarly, when the inner arm element 37 is switched ON, the current flows from the primary conductor 55 to the inner ring section 33. Meanwhile, when the inner arm element 37 is switched OFF, the primary conductor 55 and the inner ring section 33 are insulated to prevent the current flow from the primary conductor 55 to the inner ring section 33.

Figure 8:
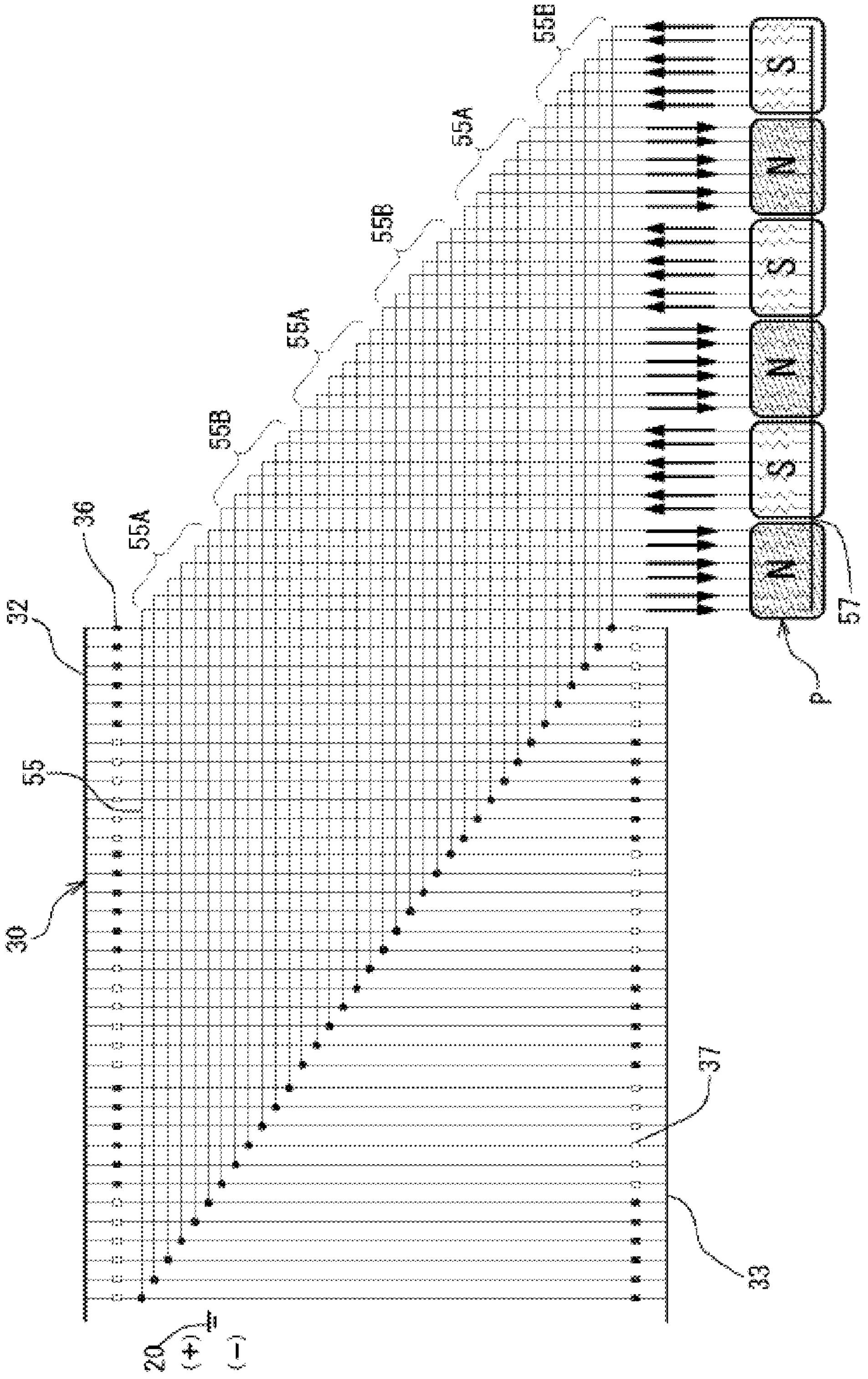
FIG. 8 is a conceptual view schematically illustrating a six-pole stator.
Figure 9:
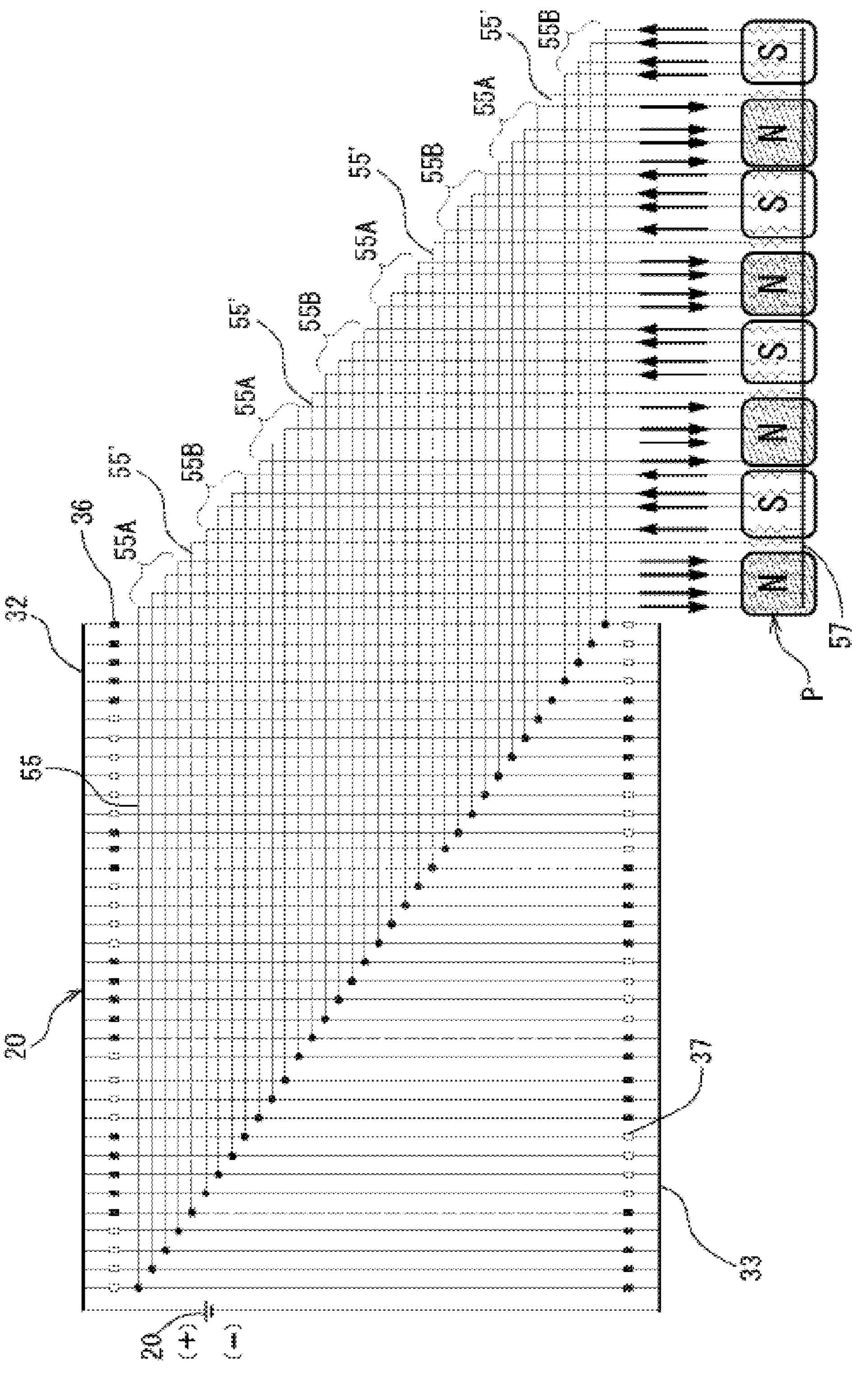
FIG. 9 is a conceptual view schematically illustrating an eight-pole stator.

FIG. 8 is a conceptual view schematically illustrating the six-pole stator 50, and FIG. 9 is a conceptual view schematically illustrating the eight-pole stator 50. In FIG. 8 and FIG. 9, in order to make the drawings easily viewable, the outer ring section 32, the inner ring section 33, and the bus ring 57, each of which has the ring shape, are deformed into straight lines. In addition, in FIG. 8 and FIG. 9, each of the outer arm element 36 and the inner arm element 37 indicated in a blank form represents a switch ON state, and each of the outer arm element 36 and the inner arm element 37 indicated in black represents a switch OFF state.

In an example illustrated in FIG. 8, the motor ECU 13 brings each of the outer arm elements 36 connected to the six primary conductors 55 into the switch ON state and each of the inner arm elements 37 connected thereto into the switch OFF state such that the current flows rightward in FIG. 8 (from the board 31 side toward the bus ring 57 side in reality) and that these six primary conductors 55, which are continuously aligned (circumferentially aligned in reality), constitute a single primary conductor group 55A. In addition, the motor ECU 13 brings each of the outer arm elements 36 connected to the six primary conductors 55 into the switch OFF state and each of the inner arm elements 37 connected thereto into the switch ON state such that the current flows leftward in FIG. 8 (from the bus ring 57 side toward the board 31 side in reality) and that these six primary conductors 55, which are continuously aligned (circumferentially aligned in reality), constitute a single primary conductor group 55B. In this way, six poles P are formed as illustrated in FIG. 8.

Meanwhile, in an example illustrated in FIG. 9, the motor ECU 13 brings each of the outer arm elements 36 connected to the four primary conductors 55 into the switch ON state and each of the inner arm elements 37 connected thereto into the switch OFF state such that the current flows rightward in FIG. 9 (from the board 31 side toward the bus ring 57 side in reality) and that these four primary conductors 55, which are continuously aligned (circumferentially aligned in reality), constitute the single primary conductor group 55A. In addition, the motor ECU 13 brings each of the outer arm elements 36 connected to the four primary conductors 55 into the switch OFF state and each of the inner arm elements 37 connected thereto into the switch ON state such that the current flows leftward in FIG. 9 (from the bus ring 57 side toward the board 31 side in reality) and that these four primary conductors 55, which are continuously aligned (circumferentially aligned in reality), constitute the single primary conductor group 55B. Furthermore, the motor ECU 13 brings the outer arm element 36 and inner arm element 37, each of which is connected to a primary conductor 55', into the switch OFF state such that the primary conductor 55', through which the current does not flow, is generated at intervals of eight conductors in the primary conductor group 55A and the primary conductor group 55B. In this way, the eight poles P are formed as illustrated in FIG. 9.

Since it is difficult for the driver to recognize vibration of the motor 40 in the electric vehicle 1, such a case is assumed that, when the driver who is accustomed to driving the engine vehicle drives the electric vehicle 1, the driver may feel a sense of discomfort due to a reason that the driver cannot recognize a driving state from the vibration transmitted to a cabin. In this respect, in this embodiment, by intentionally creating the primary conductor 55', through which the current does not flow, the gap is generated between the magnetic fields, and a pitch of the poles P becomes unequal. Thus, pulsation can occur. In this way, the driver can recognize the driving state from the vibration of the motor 40 that is transmitted to the cabin. Thus, also from a perspective of the vibration, it is possible to induce a driving feeling similar to that obtained by driving the engine vehicle.

Just as described, the motor 40 in this embodiment is configured to change the number of the poles of the stator 50 when the motor ECU 13 changes a flow direction of the current through each of the 36 primary conductors 55 via the signal line terminal 38, so as to increase or reduce the number of the primary conductor groups 55A, 55B, in each of which the current flows in the same direction and the primary conductors 55 are continuously the aligned in circumferential direction. Hereinafter, this will also be referred to as "pole number change control".

In this way, in relation to the claims, the ECU 11, the motor ECU 13, and the inverter 30 in this embodiment correspond to a "motor control section (e.g., motor circuitry) capable of changing the number of the poles of the stator by changing the flow direction of the current through each of the primary conductors in the motor, so as to increase or reduce the number of the primary conductor groups in each of which the current flows in the same direction and the primary conductors are continuously aligned in the circumferential direction" as described in the disclosure. Hereinafter, the ECU 11, the motor ECU 13, and the inverter 30 will also be referred to as the "ECU 11 and the like".

The six poles and the eight poles are merely examples. Thus, by using the same inverter 30 and stator 50, it is also possible to produce the four poles by forming the primary conductor groups 55A, 55B, each of which includes the nine primary conductors 55, for example. Alternatively, for example, the 16 poles can be produced by forming the primary conductor groups 55A, 55B, each of which includes the 2 primary conductors 55, and generating the primary conductor 55', through which the current does not flow, at the intervals of the 8 conductors. Further alternatively, the four poles or the six poles with three phases (a U-phase, a V-phase, and a W-phase) can be produced. In addition, since the inverter 30 in this embodiment has the same function as a normal inverter except that the number of the poles of the stator 50 can be changed, it is naturally possible to charge the battery 20 by converting regenerative power by the motor 40 to the direct current and supplying the direct current to the battery 20.

—Motor ECU—

Similar to the ECU 11 and the battery ECU 15, the motor ECU 13 is configured to include a so-called microcomputer having, for example, a CPU, ROM, RAM, backup RAM, an input/output interface, and the like. The CPU processes the signal according to the program that is stored in the ROM in advance while using a temporary storage function of the RAM, and thereby executes various types of control.

As described above, the motor ECU 13 is connected to the ECU 11 via the CAN communication line, and is configured to output, to the ECU 11, a signal on the temperature of the motor 40 received from the motor temperature sensor 43, a signal on the motor torque received from the torque sensor 45, and a signal on the rotation angle of the rotor 60 received from the rotation angle sensor 47. In this way, as will be described below, the motor ECU 13 is configured to control the motor 40 such that an input current of a predetermined phase, a predetermined advance angle, and a predetermined magnitude flows through the primary conductor 55 on the basis of the rotation angle of the rotor 60 detected by the rotation angle sensor 47, and the like, so as to generate the required torque for the motor 40 input from the ECU 11.

Figure 10A:
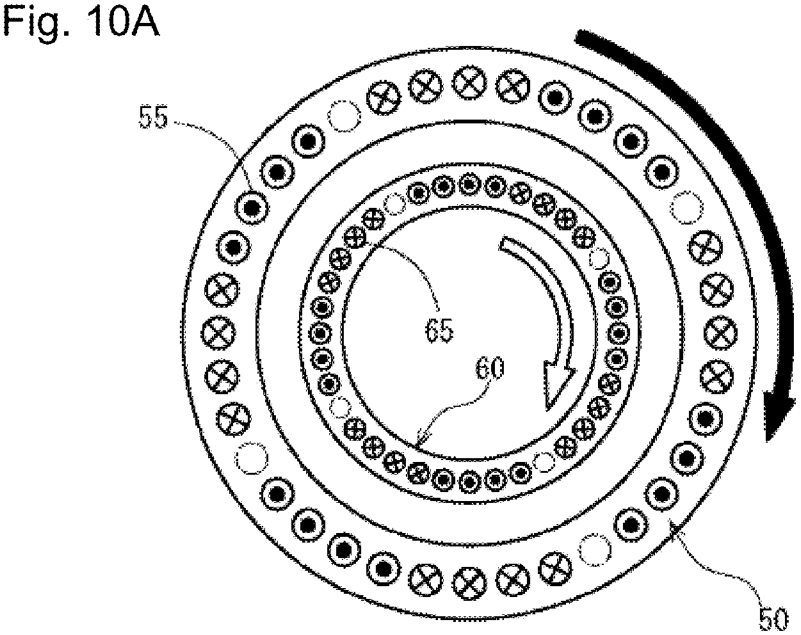
Figure 10B:
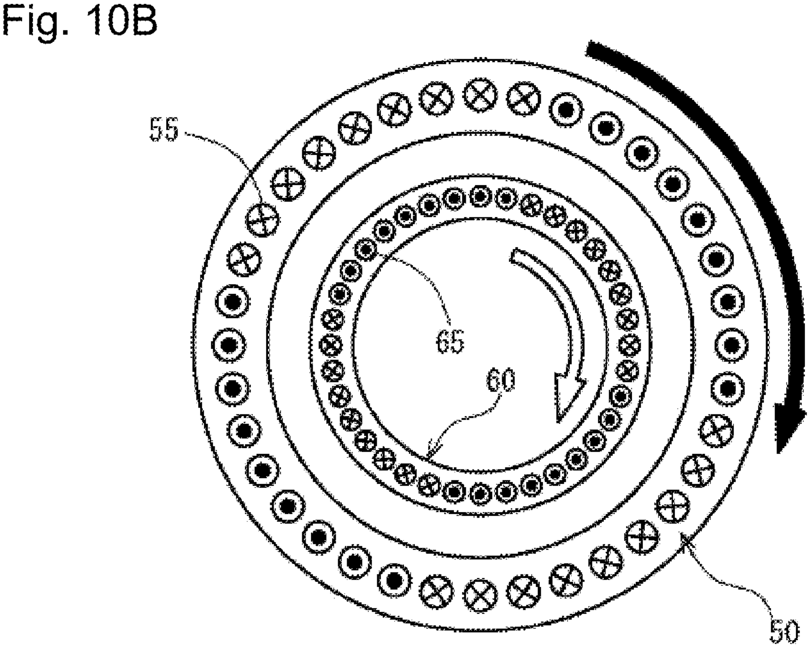

FIGS. 10A and 10B include views, each of which schematically illustrate a principle of rotation of the motor 40, and in which FIG. 10A illustrates the eight-pole motor 40 in a low-speed range, and FIG. 10B illustrates the four-pole motor 40 in a high-speed range. In FIGS. 10A and 10B, an arrowhead symbol with an X inside a circle indicates that the current flows toward the back of the sheet (for example, from the board 31 side toward the bus ring 57 side), while an arrowhead symbol with a black dot in a circle indicates that the current flows toward the front of the sheet (for example, from the bus ring 57 side toward the board 31 side).

Since the motor rotation speed of the motor 40 is inversely proportional to the number of the poles of the stator 50, as illustrated in FIG. 10A, in the low-speed range, the motor ECU 13 sets the number of the poles to eight (a relatively large number), for example. Then, the motor ECU 13 supplies the current to the stator 50 (the primary conductor 55) via the signal line terminal 38 while causing high-speed switching of the outer arm element 36 and the inner arm element 37, so as to generate a clockwise rotating magnetic field as indicated by a black arrow in FIG. 10(*a*). Consequently, the secondary conductor 65 moves relative to the rotating magnetic field, and thus the induced current flows through the secondary conductor 65 due to Fleming's right-hand rule. When the current flows through the secondary conductor 65 in the rotating magnetic field, just as described, an electromagnetic force is generated in the secondary conductor 65 due to Fleming's left-hand rule. In this way, as indicated by a blank arrow in FIG. 10(*a*), asynchronous operation is performed in which the rotor 60 embedded with the secondary conductor 65 rotates clockwise at a low speed with a delay from rotation of the rotating magnetic field.

Meanwhile, as illustrated in FIG. 10B, in the high-speed range, the motor ECU 13 sets the number of the poles to four (a relatively small number), for example. Then, when the motor ECU 13 generates the clockwise rotating magnetic field as indicated by a black arrow in FIG. 10B, the electromagnetic force is generated in the secondary conductor 65. In this way, as indicated by a blank arrow in FIG. 10B, the asynchronous operation is performed in which the rotor 60 embedded with the secondary conductor 65 rotates clockwise at a high speed with the delay from the rotation of the rotating magnetic field.

(Pole Number Change Control)

As described above, the electric vehicle 1 according to this embodiment is not equipped with the transmission, which is normally mounted on the engine vehicle. Accordingly, when the driver who is accustomed to driving the engine vehicle drives the electric vehicle 1, such a case is assumed that the driver obtains the different driving feeling (the sense of discomfort).

For this reason, in the vehicle drive system 10 according to this embodiment, the ECU 11 and the like are configured to change the characteristics of the motor 40 (the motor rotation speed and the motor torque), more specifically, the number of the poles of the stator 50 on the basis of at least one of a driving operation by the driver and a travel state of the electric vehicle 1.

In detail, allowable limit torque that corresponds to each of variable numbers of poles, such as four poles, six poles, and eight poles, is stored in the ROM of the ECU 11. Then, the ECU 11 is configured to detect the required torque for the motor 40 on the basis of at least one of the driving operation by the driver and the travel state of the electric vehicle 1 and to select the number of the poles that satisfies such required torque by using the allowable limit torque.

By configuring the ECU 11 and the like, just as described, for example, when the number of the poles of the stator 50 is relatively increased, the motor torque is relatively increased, and a feeling similar to that at a low-speed stage can be induced. Meanwhile, when the number of the poles of the stator 50 is relatively reduced, the motor rotation speed is relatively increased, and a feeling similar to that at a high-speed stage can be induced.

Here, the "driving operation by the driver" includes an accelerator operation and a brake operation. The ECU 11 is configured to detect the required torque for the motor 40 by using a control map (a first control map) stored in the ROM in advance, so as to change the number of the poles of the stator 50 on the basis of such required torque. In the control map (the first control map), the required torque for the motor 40, which is defined by the accelerator pedal depression amount (and the brake pedal depression amount) and the vehicle speed V, is mapped.

More specifically, in the case where required drive power (the required torque) is high, the ECU 11 is configured to use the first control map and increase the number of the poles of the stator 50 to be larger than that when the required drive power is low. The required drive power (the required torque) is estimated by using the first control map on the basis of the vehicle speed V detected by the vehicle speed sensor 74 and the accelerator pedal depression amount (the accelerator operation) detected by the accelerator pedal sensor 70. When the required drive power is high as in a case where (1) the accelerator pedal is depressed heavily to overtake a vehicle during high-speed travel, for example, the ECU 11 and the like increase the number of the poles of the stator 50. As a result, it is possible to increase the motor torque (the acceleration) and thereby induce an acceleration feeling in response to the driver's preference.

Meanwhile, in the case where a required braking force, which is estimated on the basis of the vehicle speed V and the brake pedal depression amount (the brake operation) detected by the brake pedal sensor 71, is large, the ECU 11 is configured to increase the number of the poles of the stator 50 to be larger than that when the required braking force is small. When the required braking force is large as in a case of (2) sudden deceleration in which the brake pedal is depressed during the high-speed travel or during travel in the urban area, for example, the ECU 11 and the like increase the number of the poles of the stator 50. As a result, it is possible to generate a large regenerative braking force and thereby induce a deceleration feeling in response to the driver's preference.

On the contrary, the ECU 11 is configured to reduce the number of the poles of the stator 50 in the case where the required drive power (the required torque) is low. The required drive power (the required torque) is estimated by using the first control map on the basis of the vehicle speed V detected by the vehicle speed sensor 74 and the accelerator pedal depression amount (the accelerator operation) detected by the accelerator pedal sensor 70. When the required drive power (the required torque) is low as in a case during (3) high-speed cruising, (4) slow driving in the urban area, or (5) coasting deceleration during the high-speed travel or in the urban area, for example, the ECU 11 and the like reduces the number of the poles of the stator 50. As a result, it is possible to induce the deceleration feeling in response to the driver's preference.

The "travel state of the own vehicle" includes the surrounding travel environment of the electric vehicle 1. As described above, the ECU 11 acquires the surrounding travel environment of the electric vehicle 1 (the flat road, the uphill road, the downhill road, turning, the winding road, or the urban area) on the basis of the location information received from the GPS receiver 75 and the map database stored in the ROM. The ECU 11 is configured to detect the required torque for the motor 40 by using a control map (a second control map) stored in the ROM in advance, so as to change the number of the poles of the stator 50 on the basis of such required torque. In the control map (the second control map), the required torque for the motor 40, which is defined by the vehicle speed V and the surrounding travel environment, is mapped. For example, the ECU 11 is configured to increase the number of the poles of the stator 50 when the electric vehicle 1 (6) starts traveling on the uphill road. Just as described, when the electric vehicle 1 starts traveling on the uphill road, the number of the poles of the stator 50 is increased, and thus can increase the motor torque. As a result, the electric vehicle 1 can smoothly climb the uphill road.

However, such a case is assumed that, when the ECU 11 changes the number of the poles of the stator 50 (the characteristic of the motor) on the basis of the accelerator operation, the brake operation, and the surrounding travel environment of the electric vehicle 1 while the "manual mode" is selected by the driver, the driver feels the sense of discomfort. Accordingly, in this embodiment, when the "manual mode" is selected by the driver, in order to execute the pole number change control, to which the driver's intention expressed by the operation of the shift lever 2*a* or the paddle switch 73 is reflected, the ECU 11 sets the required torque to be increased in the order of D−−, D−, D, D+, D++, and changes the number of the poles, so as to generate such required torque. Since the number of the poles of the stator 50 is changed according to the operation of the shift lever 2*a* or the paddle switch 73 by the driver as described above, in other words, the number of the poles is changed in response to the driver's request, the motor control that further corresponds to the driver's preference can be executed.

(Connection Mode Change Control)

By the way, the motor 40 has a property that the motor torque is increased in proportion to the current while the motor rotation speed is increased with an increase in the voltage. In addition, as described above, when the number of the battery module pairs 22 connected in parallel is increased, the supply current can be increased relatively. Meanwhile, when the number of the battery module pairs 22 connected in series is increased, the supply voltage can be increased relatively.

Thus, in the vehicle drive system 10 according to this embodiment, the ECU 11 and the battery ECU 15 (hereinafter referred to as the "battery ECU 15 and the like") are configured to change the connection mode of the battery module pairs 22 according to a travel mode of the electric vehicle 1. By configuring the battery ECU 15 and the like, just as described, for example, when the number of the battery module pairs 22 connected in parallel is increased, the large current is supplied to the motor 40, and thus the motor torque can be increased relatively. Meanwhile, when the number of the battery module pairs 22 connected in series is increased, the high voltage is supplied to the motor 40, and thus the motor rotation speed can be increased relatively.

As described above, according to the connection mode change control, the characteristic of the motor 40 can be changed before and after the change. Thus, similar to the pole number change control, the motor control that corresponds to the driver's preference (the travel mode of the electric vehicle 1) can be executed.

(Cooperative Control)

When the pole number change control and the connection mode change control are executed together, with effects of both of the control, the motor torque can further be increased, and the motor rotation speed can further be increased. Thus, it is possible to handle the wide range of the required output according to the driver's preference. However, when these types of the control are executed at the same time, the vehicle system may become unstable due to a sudden state change.

Accordingly, in the vehicle drive system 10 according to this embodiment, the ECU 11, the motor ECU 13, and the battery ECU 15 are configured to execute cooperative control in which the pole number change control for changing the number of the poles of the stator 50 and the connection mode change control for changing the connection mode of the battery module pairs 22 are initiated at different timings.

Here, "initiated at different timings" includes a case where the connection mode change control is initiated while the number of the poles of the stator 50 is being changed, for example. However, since it is considered that a sudden change in the state of the vehicle system is most likely to occur at initiation of each control. Thus, also in this case, the pole number change control and the connection mode change control are initiated at the different timings, so as to ensure an effect of suppressing the vehicle system from becoming unstable.

In order to further reliably suppress the vehicle system from becoming unstable, the ECU 11, the motor ECU 13, and the battery ECU 15 are preferably configured to change the connection mode of the battery module pairs 22 when a predetermined time T elapses after the number of the poles is changed in the case where the number of the poles of the stator 50 is changed. Here, the "predetermined time T" is a time until a pole number change transition state is stabilized, and is set from 0.3 to 1.0 second, for example. According to such cooperative control, the connection mode change control for changing the connection mode of the battery module pairs 22 is executed when the predetermined time T elapses after the pole number change control is executed to change the number of the poles of the stator 50, in other words, after the transition state of the pole number change is stabilized. Thus, it is possible to further reliably suppress the vehicle system from becoming unstable.

Then, at the time of changing the connection mode of the battery module pairs 22 after the lapse of the predetermined time T, in the case where the DC power supply voltage value PSV of the battery 20 is lower than a back electromotive voltage RV of the motor 40, that is, in case of charging, the battery ECU 15 and the like connect all the battery modules 21 in parallel to improve electricity economy by regeneration.

On the contrary, in the case where the DC power supply voltage value PSV of the battery 20 is higher than the back electromotive voltage RV of the motor 40, the battery ECU 15 and the like increase the number of the battery module pairs 22 connected in parallel to be larger than the current number thereof when a potential difference PD between the DC power supply voltage value PSV and the back electromotive voltage RV is larger than a target potential difference TPD, and increases the number of the battery module pairs 22 connected in series to be larger than the current number thereof when the potential difference PD is smaller than the target potential difference TPD. The "target potential difference TPD" is a value that is set in advance according to the travel mode of the electric vehicle 1.

In the detailed description of this configuration, electric power moves from the higher voltage to the lower voltage. In the case where the DC power supply voltage value PSV of the battery 20 is higher than the back electromotive voltage RV of the motor 40, that is, in the case of electrical discharge in which electric power is supplied to the motor 40 side, the potential difference PD that is equal to a difference between the DC power supply voltage value PSV and the back electromotive voltage RV and can be used to rotationally drive the motor 40 (hereinafter also referred to as an "available potential difference PD") is generated.

Here, the DC power supply voltage value PSV of the battery 20 fluctuates in conjunction with the SOC. Since the back electromotive voltage RV is increased with an increase in the motor rotation speed, the available potential difference PD tends to be reduced. Meanwhile, since the back electromotive voltage RV is reduced with a reduction in the motor rotation speed, the available potential difference PD tends to be increased. In other words, the available potential difference PD is increased or reduced according to the travel mode of the electric vehicle 1.

For example, the large motor torque is required to (6) start traveling on the uphill road described above. However, due to a property of the motor 40 that the motor torque is increased in proportion to the current, the relatively small target potential difference TPD is preferably set. On the contrary, for example, the high motor rotation speed is required for (3) high-speed cruising described above. However, due to a property of the motor 40 that the motor rotation speed is increased with the increase in the voltage, the relatively large target potential difference TPD is preferably set.

Based on these ideas, FIG. 11 illustrates tendencies of the set target potential difference TPD. The target potential difference TPD is stored in the ROM of the ECU 11 in association with the travel mode of the electric vehicle 1.

As illustrated in FIG. 11, first, (1) in the case of overtaking at the high speed, since the required torque is "+HIGH", the pole number change control is executed to set the number of the poles to "LARGE". In this case, since the motor rotation speed is "+HIGH", the back electromotive voltage RV also becomes "+HIGH". Thus, the available potential difference PD tends to become "SMALL". Then, in order to increase the motor rotation speed for overtaking, the target potential difference TPD is set to "LARGE". As a result, such a condition that the available potential difference PD is equal to or smaller than the target potential difference TPD is easily satisfied. Consequently, the number of the battery module pairs 22 connected "IN SERIES", which is a recommended connection mode, is increased, and the high voltage is supplied to the motor 40. Thus, it is possible to generate the high motor rotation speed that is required for overtaking.

In the case of the (6) start on the uphill road, the required torque is "+HIGH", the pole number change control is executed to set the number of the poles to "LARGE". In this case, since the motor rotation speed is "+LOW", the back electromotive voltage RV also becomes "+LOW". Thus, the available potential difference PD tends to become "MEDIUM (to LARGE)". Then, in order to increase the motor torque for the start on the uphill road, the target potential difference TPD is set to "SMALL". As a result, such a condition that the available potential difference PD is larger than the target potential difference TPD is easily satisfied. Consequently, the number of the battery module pairs 22 connected "IN PARALLEL", which is the recommended connection mode, is increased, and the high voltage is supplied to the motor 40. Thus, it is possible to generate the large torque that is required to start on the uphill road.

Furthermore, in the case of (3) high-speed cruising, since the required torque is "+LOW", the pole number change control is executed to set the number of the poles to "SMALL". In this case, since the motor rotation speed is "+HIGH", the back electromotive voltage RV also becomes "+HIGH". Thus, the available potential difference PD tends to become "(SMALL to) MEDIUM". Then, in order to maintain the high motor rotation speed to continue high-speed cruising, the target potential difference TPD is set to "LARGE". As a result, such a condition that the available potential difference PD is equal to or smaller than the target potential difference TPD is easily satisfied. Consequently, the number of the battery module pairs 22 connected "IN SERIES", which is a recommended connection mode, is increased, and the high voltage is supplied to the motor 40. Thus, it is possible to generate the high motor rotation speed that is required for high-speed cruising.

In the case of (4) slow driving in the urban area, since the required torque is "+LOW", the pole number change control is executed to set the number of the poles to "SMALL". In this case, since the motor rotation speed is "+LOW", the back electromotive voltage RV also becomes "+LOW". Thus, the available potential difference PD tends to become "LARGE". Then, in order to increase the motor torque for regeneration, the target potential difference TPD is set to "SMALL". As a result, such a condition that the available potential difference PD is larger than the target potential difference TPD is easily satisfied. As a result, the number of the battery module pairs 22 connected "IN PARALLEL", which is the recommended connection mode, is increased. Thus, it is possible improve the electricity economy by the regeneration.

As it has been described so far, according to the vehicle drive system 10 in this embodiment, the ECU 11, the motor ECU 13, and the battery ECU 15 are configured to initiate the pole number change control and the connection mode change control at the mutually different timings. Thus, it is possible to change the characteristic of the motor 40 while suppressing the vehicle system from becoming unstable.

(Control Flow)

Figure 12:
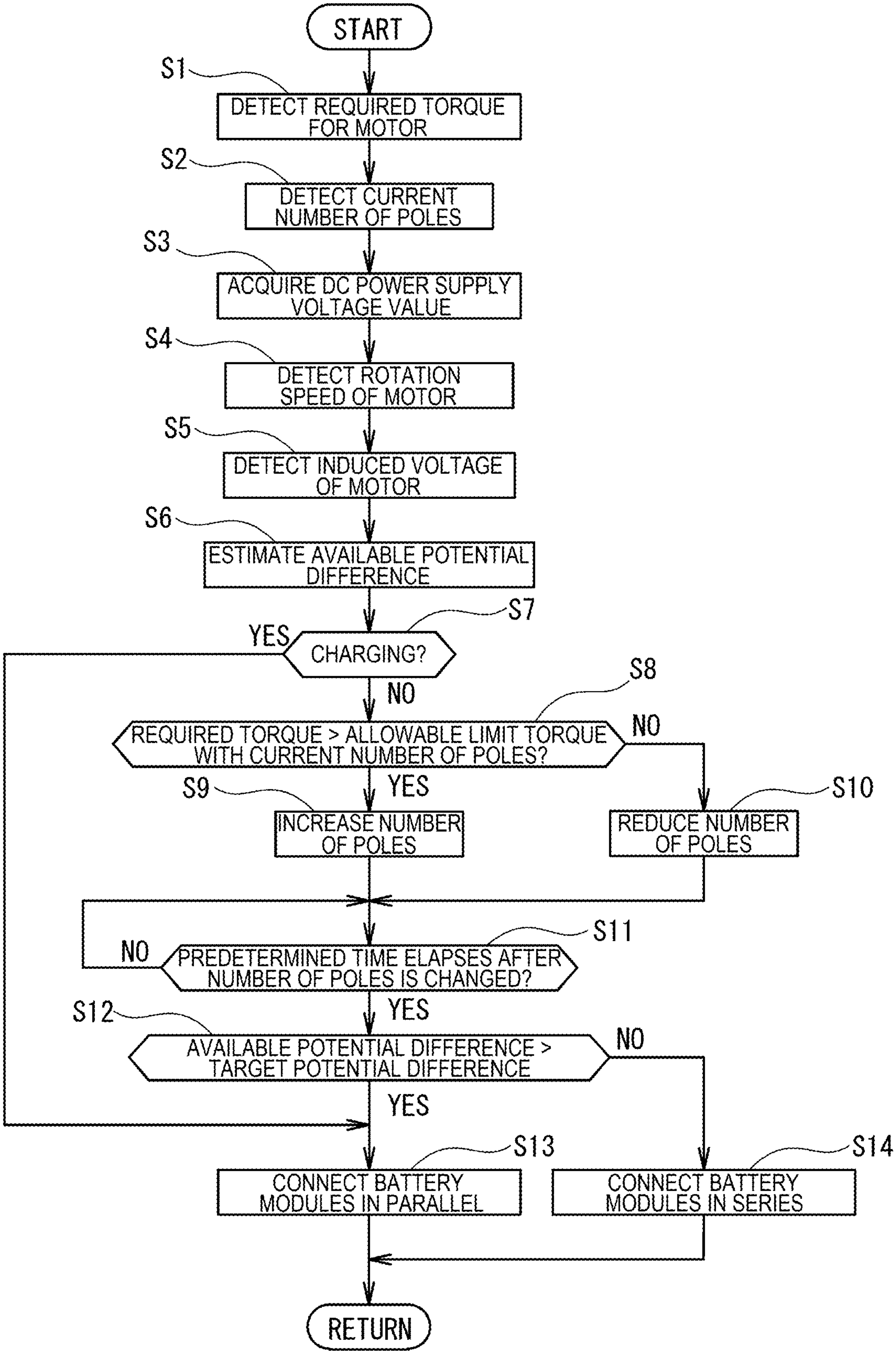
FIG. 12 is a flowchart illustrating an example of cooperative control that is executed by a control section.

Next, a description will be made on examples of the pole number change control and the connection mode change control, which are executed by the ECU 11 and the like, with reference to a flowchart illustrated in FIG. 12.

First, in step S1, the ECU 11 detects the required torque for the motor 40. More specifically, the ECU 11 uses the first or second control map stored in the ROM to detect the required torque on the basis of the accelerator pedal depression amount, the brake pedal depression amount, the vehicle speed V, the surrounding travel environment, and the like. Then, the processing proceeds to step S2.

In next step S2, the ECU 11 detects the current number of the poles of the stator 50. Then, the processing proceeds to step S3. In next step S3, the ECU 11 acquires the DC power supply voltage value PSV of the battery 20. Then, the processing proceeds to step S4.

In next step S4, the ECU 11 detects the rotation speed of the motor 40 (the motor rotation speed). Then, the processing proceeds to step S5. In next step S5, the ECU 11 estimates the induced voltage (the back electromotive voltage RV) of the motor 40 on the basis of the motor rotation speed detected in step S4. Then, the processing proceeds to step S6.

In next step S6, the ECU 11 estimates the available potential difference PD on the basis of the DC power supply voltage value PSV of the battery 20, which is acquired in step S3, and the back electromotive voltage RV of the motor 40, which is estimated in step S5. Then, the processing proceeds to step S7.

In next step S7, the ECU 11 determines whether charging is in progress, that is, whether the available potential difference PD<0 is satisfied. If it is determined YES in this step S7, the processing proceeds to step S13, and the battery ECU 15 and the like connect all of the plural battery modules 21 in parallel. Then, the processing returns. On the other hand, if it is determined NO in this step S7, that is, if the electrical discharge is in progress, the processing proceeds to step S8.

In next step S8, the ECU 11 determines whether the required torque for the motor 40, which is detected in step S1, is higher than the allowable limit torque with the current number of the poles, which is acquired in step S2. If it is determined YES in this step S8, that is, if the required torque is higher than the allowable limit torque with the current number of the poles, the processing proceeds to step S9. Then, after the ECU 11 and the like increase the number of the poles of the stator 50 to be larger than the current number of the poles, the processing proceeds to step S11. On the other hand, if it is determined NO in this step S8, that is, if the required torque is equal to or lower than the allowable limit torque with the current number of the poles, the processing proceeds to step S10. Then, after the ECU 11 and the like reduce the number of the poles of the stator 50 to be smaller than the current number of the poles, the processing proceeds to step S11.

In next step S11, the ECU 11 uses an electrically-connected clock or the like to determine whether the predetermined time T has elapsed since the change in the number of the poles in step S9 or step S10. If it is determined NO in step S11, the ECU 11 continues making the determination until it is determined YES. If it is determined YES in this step S11, that is, if the predetermined time T has elapsed since the change in the number of the poles, the processing proceeds to step S12.

In next step S12, the ECU 11 determines whether the available potential difference PD, which is estimated in step S6, is larger than the target potential difference TPD, which is stored in ROM in advance. If it is determined YES in this step S12, that is, if the available potential difference PD is larger than the target potential difference TPD (if there is a margin of voltage), the processing proceeds to step S13. Then, after the battery ECU 15 and the like connect all of the plural battery modules 21 in parallel, the processing returns.

On the other hand, if it is determined NO in this step S12, that is, if the available potential difference PD is equal to or smaller than the target potential difference TPD (if there is no margin of voltage), the processing proceeds to step S14. Then, after the battery ECU 15 and the like connect all of the plural battery modules 21 in series, the processing returns.

Other Embodiments

The disclosure is not limited to the embodiment and can be carried out in various modes without departing from the spirit and main features thereof.

In the above embodiment, the asynchronous operation is performed in which the rotor 60 is rotated by using the induced current generated in the secondary conductor 65. However, the disclosure is not limited thereto. For example, synchronous operation may be performed. In the synchronous operation, plural permanent magnets are aligned in the circumferential direction in a portion of the rotor 60 on the radially inner side of the secondary conductor 65, and the rotor 60 is rotated by using magnetic forces of the permanent magnets.

In the above embodiment, the motor 40 is arranged in the front portion of the electric vehicle 1 in the vehicle front-rear direction, and the front wheels 7 are the drive wheels. However, the disclosure is not limited thereto. For example, the motor 40 may be arranged in a rear portion of the electric vehicle 1 in the vehicle front-rear direction, and the rear wheels 8 may be the drive wheels.

Furthermore, in the above embodiment, the description has been made on the case where the connection mode change control is executed after the execution of the pole number change control. However, the disclosure is not limited thereto. The pole number change control may be executed after the execution of the connection mode change control.

As described above, the above-described embodiment is merely illustrative in all respect and thus should not be construed in a restrictive manner. Furthermore, modifications and changes that fall within equivalents of the claims fall within the scope of the disclosure.

INDUSTRIAL APPLICABILITY

According to the disclosure, it is possible to change the characteristic of the motor while suppressing the vehicle system from becoming unstable. Thus, the application of the disclosure to the vehicle drive system capable of changing the characteristic of the motor is extremely beneficial.

DESCRIPTION OF REFERENCE SIGNS AND NUMERALS

1: VEHICLE
3: STEERING WHEEL
7: FRONT WHEEL (DRIVE WHEEL)
10: VEHICLE DRIVE SYSTEM
11: ECU (MOTOR CONTROL SECTION (MOTOR CIRCUITRY), BATTERY CONTROL SECTION (BATTERY CIRCUITRY))
13: MOTOR ECU (MOTOR CONTROL SECTION)
15: BATTERY ECU (BATTERY CONTROL SECTION)
20: BATTERY
21: CELL MODULE
22: CELL MODULE PAIR
30: INVERTER (MOTOR CONTROL SECTION)
40: MOTOR
50: STATOR
55: PRIMARY CONDUCTOR
55A: PRIMARY CONDUCTOR GROUP
55B: PRIMARY CONDUCTOR GROUP
60: ROTOR
65: SECONDARY CONDUCTOR
73: PADDLE SWITCH (PADDLE SHIFT SWITCH)
P: POLE
PD: POTENTIAL DIFFERENCE
PSV: AC POWER SUPPLY VOLTAGE VALUE
RV: REVERSE VOLTAGE
T: PREDETERMINED TIME
TPD: TARGET POTENTIAL DIFFERENCE

The invention claimed is:

1. A vehicle drive system comprising:

a motor that has a cylindrical stator and a cylindrical rotor rotatably provided in the stator to be coaxial with a center axis of the stator and that drives a drive wheel of a vehicle by rotation of the rotor; and a battery configured to supply electric power to the motor, the stator having primary conductors that extend in an axial direction and are aligned in a circumferential direction, the rotor having secondary conductors that extend in the axial direction and are aligned in the circumferential direction in a radially outer portion, and the battery having battery packs, motor circuitry configured to change a number of poles of the stator by changing a direction of a current flowing through the primary conductors in the motor and increasing/reducing a number of primary conductor groups, in each of which the current flows in a same direction and the primary conductors are continuously aligned; and battery circuitry configured to change a connection mode of at least one battery pack pair between in series and in parallel, the at least one battery pack pair constituting the battery packs, and the battery pack pairs being electrically connected to each other, wherein the motor circuitry and the battery circuitry are configured to start changing the number of the poles of the stator by the motor circuitry and changing the connection mode of the battery pack pair by the battery circuitry at different timings from each other, and the battery circuitry is configured to increase a number of the battery pack pairs connected in parallel to be larger than a current number thereof in a case where a power supply voltage of the battery is higher than a back electromotive voltage and a potential difference between the power supply voltage and the back electromotive voltage is larger than a target potential difference that is set in advance according to a travel mode of the vehicle.

2. The vehicle drive system according to claim 1, wherein the battery circuitry is configured to change the connection mode of the battery pack pair when a predetermined time elapses after the number of the poles is changed in a case where the motor circuitry changes the number of the poles of the stator.

3. The vehicle drive system according to claim 1, wherein the battery circuitry is configured to increase the number of the battery pack pairs connected in series to be larger than the current number thereof in a case where the power supply voltage of the battery is higher than the back electromotive voltage of the motor and a positional difference between the power supply voltage and the back electromotive voltage is equal to or smaller than a target potential difference that is set in advance according to the travel mode of the vehicle.

4. The vehicle drive system according to claim 1, wherein
a paddle shift switch is provided on a steering wheel of the vehicle, and
the motor circuitry is configured to change the number of the poles of the stator in response to an operation of the paddle shift switch by a driver.

5. The vehicle drive system according to claim 2, wherein
the battery circuitry is configured to increase the number of the battery pack pairs connected in series to be larger than the current number thereof in a case where the power supply voltage of the battery is higher than the back electromotive voltage of the motor and a positional difference between the power supply voltage and the back electromotive voltage is equal to or smaller than a target potential difference that is set in advance according to the travel mode of the vehicle.

6. The vehicle drive system according to claim 2, wherein
a paddle shift switch is provided on a steering wheel of the vehicle, and
the motor circuitry is configured to change the number of the poles of the stator in response to an operation of the paddle shift switch by a driver.

7. A vehicle drive system comprising:
a motor that has a cylindrical stator and a cylindrical rotor rotatably provided in the stator to be coaxial with a center axis of the stator and that drives a drive wheel of a vehicle by rotation of the rotor; and
a battery configured to supply electric power to the motor,
the stator having primary conductors that extend in an axial direction and are aligned in a circumferential direction,
the rotor having secondary conductors that extend in the axial direction and are aligned in the circumferential direction in a radially outer portion, and
the battery having battery packs,
motor circuitry configured to change a number of poles of the stator by changing a direction of a current flowing through the primary conductors in the motor and increasing/reducing a number of primary conductor groups, in each of which the current flows in a same direction and the primary conductors are continuously aligned; and
battery circuitry configured to change a connection mode of at least one battery pack pair between in series and in parallel, the at least one battery pack pair constituting the battery packs, and the battery pack pairs being electrically connected to each other, wherein
the motor circuitry and the battery circuitry are configured to start changing the number of the poles of the stator by the motor circuitry and changing the connection mode of the battery pack pair by the battery circuitry at different timings from each other, and
the battery circuitry is configured to increase the number of the battery pack pairs connected in series to be larger than a current number thereof in a case where a power supply voltage of the battery is higher than a back electromotive voltage of the motor and a positional difference between the power supply voltage and the back electromotive voltage is equal to or smaller than a target potential difference that is set in advance according to a travel mode of the vehicle.

8. A vehicle drive system comprising:
a motor that has a cylindrical stator and a cylindrical rotor rotatably provided in the stator to be coaxial with a center axis of the stator and that drives a drive wheel of a vehicle by rotation of the rotor; and
a battery configured to supply electric power to the motor,
the stator having primary conductors that extend in an axial direction and are aligned in a circumferential direction,
the rotor having secondary conductors that extend in the axial direction and are aligned in the circumferential direction in a radially outer portion, and
the battery having battery packs,
motor circuitry configured to change a number of poles of the stator by changing a direction of a current flowing through the primary conductors in the motor and increasing/reducing a number of primary conductor groups, in each of which the current flows in a same direction and the primary conductors are continuously aligned; and
battery circuitry configured to change a connection mode of at least one battery pack pair between in series and in parallel, the at least one battery pack pair constituting the battery packs, and the battery pack pairs being electrically connected to each other, wherein
the motor circuitry and the battery circuitry are configured to start changing the number of the poles of the stator by the motor circuitry and changing the connection mode of the battery pack pair by the battery circuitry at different timings from each other,
the battery circuitry is configured to change the connection mode of the battery pack pair when a predetermined time elapses after the number of the poles is changed in a case where the motor circuitry changes the number of the poles of the stator, and
the battery circuitry is configured to increase the number of the battery pack pairs connected in series to be larger than the current number thereof in a case where a power supply voltage of the battery is higher than a back electromotive voltage of the motor and a positional difference between the power supply voltage and the back electromotive voltage is equal to or smaller than a target potential difference that is set in advance according to a travel mode of the vehicle.

* * * * *